United States Patent [19]

Pfeifer et al.

[11] 4,225,701
[45] Sep. 30, 1980

[54] CRYSTALLINE POLYAMIDES FROM BRANCHED CHAIN DIAMINE AND TEREPHTHALIC ACID

[75] Inventors: Josef Pfeifer, Therwil; Heinz Peter, Rheinfelden, both of Switzerland

[73] Assignee: Ciba-Geigy Corporation, Ardsley, N.Y.

[21] Appl. No.: 954,811

[22] Filed: Oct. 26, 1978

[30] Foreign Application Priority Data

Oct. 28, 1977 [CH] Switzerland ............... 13146/77

[51] Int. Cl.$^2$ ................. C08G 69/26; C08G 69/08
[52] U.S. Cl. ................. 528/347; 528/310; 528/324; 528/330; 528/331; 528/338; 528/346; 528/349; 528/336; 260/33.4 P; 260/563 R
[58] Field of Search ......... 528/349, 338, 324, 346, 528/347, 330, 331

[56] References Cited

U.S. PATENT DOCUMENTS

| | | | |
|---|---|---|---|
| 3,150,117 | 9/1964 | Gabler | 528/349 |
| 3,352,831 | 11/1967 | Schmitt et al. | 528/349 |
| 3,563,959 | 2/1971 | Schade et al. | 528/349 |
| 3,839,295 | 10/1974 | Campbell et al. | 528/349 |
| 3,939,147 | 2/1976 | Hugelin et al. | 260/239 BC |
| 3,980,621 | 9/1976 | Campbell et al. | 528/349 |
| 4,100,111 | 7/1978 | Peter et al. | 528/116 |

FOREIGN PATENT DOCUMENTS 1129275 10/1968 United Kingdom .
1132039 10/1968 United Kingdom .
1251520 10/1971 United Kingdom .

OTHER PUBLICATIONS

Chemical Abstracts, 36, (1942), 4720$^4$.
Chemical Abstracts, 50, (1956), 15095d.
Chemical Abstracts, 53, (1959), 6641o.
Chemical Abstracts, 85, (1976), 79037(d).

*Primary Examiner*—Harold D. Anderson
*Attorney, Agent, or Firm*—Luther A. R. Hall

[57] ABSTRACT

The partially crystalline polyamides according to the invention are obtained by reacting terephthalic acid, or an amide-forming derivative thereof, with a diamine of the formula

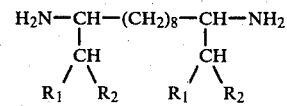

in which $R_1$ and $R_2$ singly or together are organic radicals. The reaction mixture can also contain up to 30% by weight of other amide-forming substances (aminocarboxylic acids or lactams, or mixtures of dicarboxylic acids and diamines), provided the formation of the partial crystallinity of the resulting polyamides is retained. The polyamides are suitable for producing moulded products of the most varied types. They are particularly applicable for producing filaments and fibres.

7 Claims, No Drawings

CRYSTALLINE POLYAMIDES FROM BRANCHED CHAIN DIAMINE AND TEREPHTHALIC ACID

The present invention relates to novel crystalline polyamides, to processes for producing them, and to their use for producing moulded articles.

In the U.S. Pat. No. 2,752,328 there are described linear fibre-forming polyamides from terephthalic acid and alkylenediamines which have 6 to 8 C atoms in the chain and which can be substituted in the positions 2 to 5 by one or two methyl groups, with the diamine having at most a total of 9 C atoms. Preferred diamines are, for example, 2,5-dimethylhexamethylenediamine, 2- or 3-methylhexamethylenediamine and 4-methyloctamethylenediamine. These prior known crystalline polyamides leave much to be desired however with regard to water absorption, stability to hydrolysis and/or dimensional stability under the action of moisture.

It is also known that polyamides from aliphatic or aromatic dicarboxylic acids and voluminous diamines are always transparent, that is to say amorphous; see for example the U.S. Pat. Nos. 2,864,807, 3,150,117 and 3,352,831, the Belgian Pat. No. 677,650 and the German Offenlegungsschrift No. 1,720,513. This last-mentioned German Offenlegungsschrift describes indeed generically transparent polyamides resistant to boiling and formed from aromatic dicarboxylic acids and unsubstituted or alkyl-substituted alkylenediamines which have up to 10 C atoms in the chain, and which are substituted on at least one of the two terminal C atoms by an alkyl group having 1–4 C atoms. The actual disclosure however is limited to transparent polyamides from aromatic dicarboxylic acids and alkylenediamines of the aforementioned type having at most 7 C atoms in the chain.

The object of the invention was therefore the preparation of novel crystalline polyamides which have high dimensional stability under heat, a lower absorption of water, improved stability to hydrolysis and increased dimensional stability under the action of moisture, and which are suitable for producing injection-moulding materials, and especially also for producing filaments and fibres. It has now been found that, surprisingly, novel crystalline polyamides can be produced from aromatic dicarboxylic acids and alkylenediamines having voluminous side chains.

The invention relates therefore to novel partially crystalline polyamides which can be obtained by a process comprising reacting essentially stoichiometric amounts of terephthalic acid, or of an amide-forming derivative thereof, with a diamine of the formula I

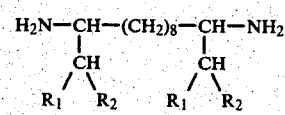  (I)

in which
R$_1$ is alkyl having 1–4 C atoms,
R$_2$ is alkyl having 1–8 C atoms, or
R$_1$ and R$_2$ together with the linkage C atom to which they are attached are in both cases cycloalkyl having 4–6 C atoms,
in which process the reaction mixture contains optionally up to 5% by weight (relative to the total mixture) of an aminocarboxylic acid of the formula II $$HOOC—Z_1—NH_2 \quad (II)$$

in which $Z_1$ is alkylene having 5 to 11 C atoms, or of a corresponding lactam, or alternatively up to 30% by weight of an essentially stoichiometric mixture of a dicarboxylic acid of the formula III $$HOOC—Z_2—COOH \quad (III)$$

in which $Z_2$ is an aliphatic radical having at least 2 C atoms, or a carbocyclic-aromatic radical in which the carbonyl groups are bound to different ring C atoms which are not adjacent, or of an amide-forming derivative thereof, with a diamine of the formula IV $$H_2N—Z_3—NH_2 \quad (IV)$$

in which $Z_3$ is

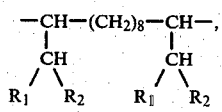

straight-chain alkylene having 2–12 C atoms, or a cycloaliphatic or araliphatic radical; and wherein the defined weight percentages in the case of amide-forming derivatives of terephthalic acid and of the dicarboxylic acid of the formula III relate to identical functional groups.

Alkyl groups denoted by R$_1$ and R$_2$ can be straight-chain or branched-chain, but are preferably straight-chain. The following may be mentioned as examples of alkyl groups as defined: the methyl, ethyl, n-propyl, isopropyl, n-butyl, sec-butyl, n-pentyl, n-hexyl, n-heptyl and n-octyl groups.

If R$_1$ and R$_2$ together with the linkage C atom to which they are attached form a cycloalkyl ring, it is preferably cyclopentyl or cyclohexyl.

If Z$_2$ is an aliphatic radical, it is in particular straight-chain alkylene having 2–12 C atoms, and preferably straight-chain alkylene having 4–10 C atoms. Alkylene groups Z$_3$ preferably contain 2–10 C atoms.

Carbocyclic-aromatic radicals denoted by Z$_2$ can be unsubstituted or substituted, for example by alkyl groups having 1–4 C atoms. They are for example monocyclic, condensed polycyclic or uncondensed bicyclic aromatic radicals, and in the case of the last-mentioned the aromatic nuclei can also be linked together by way of a bridging member, such as —O— or —SO$_2$—. Z$_2$ is particularly a 4,4'-biphenylene, 4,4'-diphenyl ether or 4,4'-diphenylsulfonyl group, the 2,4-, 3,6- or 2,7-naphthalene group, and especially the 1,3-phenylene group, but most preferably the 1,4-phenylene group.

Z$_3$ as a cycloaliphatic radical is, for example, the 1,3-cyclopentylene group, the 1,3- or 1,4-cyclohexylene group or the 4,4'-dicyclohexylmethane group, while Z$_3$ as an araliphatic radical is in particular the 1,4- or 1,3-xylylene group.

Preferred polyamides according to the invention are those which are obtained by reaction of 100 percent by weight of a mixture of essentially stoichiometric amounts of terephthalic acid, or an amide-forming derivative thereof, and a diamine of the formula I, that is to say, polyamides which consist exclusively of recurring structural elements of the formula V

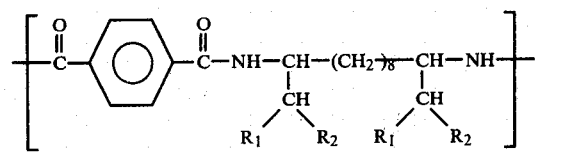

(V)

in which $R_1$ and $R_2$ have the meanings given under the formula I.

Particularly preferred are homopolyamides of the aforementioned type in which $R_1$ and $R_2$ independently of one another are alkyl having 1–4 C atoms, or $R_1$ and $R_2$ together with the linkage C atoms to which they are attached are in both cases cyclopentyl or cyclohexyl, and more especially those in which $R_1$ is methyl or ethyl, and $R_2$ is ethyl, n-propyl or n-butyl.

A further particularly preferred embodiment of the invention is constituted by those homopolyamides of the aforementioned type in which $R_1$ is methyl and $R_2$ is ethyl, or alternatively in which $R_1$ is ethyl and $R_2$ is ethyl.

If there are used in the production of copolyamides reaction mixtures which contain up to 5% by weight of an aminocarboxylic acid of the formula III or of a corresponding lactam, or up to 30% by weight of a mixture of a dicarboxylic acid of the formula III (or of an amide-forming derivative) and a diamine of the formula IV, these percentage values are to be considered as limiting values. It must always be ensured that the resulting polyamides still exhibit partial crystallinity. Depending on the nature of the addition to the starting substances of the basic polyamide, the maximum possible amounts added can of course vary greatly. If for example the diamine of the formula I used is 4,13-diamino-3,14-diethylhexadecane, the amount of the other polyamide-forming additives added can be much larger (namely up to 30% by weight) than that which can be added in cases where the diamine of the formula I used is 6,15-diamino-5,16-diethyleicosane or 5,14-diamino-4,15-dimethyloctadecane.

The percentage amount added depends however also on the additive itself. Thus, very much more of mixtures of diamines of the formula IV with adipic acid and especially with isophthalic acid can be tolerated than of caprolactam.

In the production of the polyamides according to the invention, it is possible to use as amide-forming derivatives of terephthalic acid or of the dicarboxylic acids of the formula III for example the corresponding dihalides, particularly the dichlorides, and also dinitriles or dialkyl esters and diaryl esters, particularly dialkyl esters having 1–4 C atoms in each of the alkyl moieties, and diphenyl esters.

The reaction of the reaction components as defined can be performed by methods known per se. Production by the melt polycondensation process in several stages is preferred. In this case, the reaction components as defined, for example aminocarboxylic acids of the formula II or corresponding lactams, mixtures of terephthalic acid and diamine of the formula I, and optionally mixtures of dicarboxylic acids of the formula III and diamines of the formula IV, particularly salts from terephthalic acid and diamines of the formula I, and optionally salts from dicarboxylic acids of the formula III and diamines of the formula IV, are pre-condensed at temperatures between about 220° and 300° C. in the melt, advantageously under an inert gas, such as nitrogen. The salts to be used for the pre-condensation reaction are advantageously produced separately from essentially stoichiometric amounts of terephthalic acid and diamine of the formula I, and optionally dicarboxylic acids of the formula III and diamines of the formula IV, in suitable inert organic solvents. Suitable inert organic solvents are, for example, cycloaliphatic alcohols such as cyclopentanol and cyclohexanol, and particularly aliphatic alcohols having up to 6 C atoms, such as methanol, ethanol, n-propanol, butanols, pentanols and hexanols, and also mixtures of solvents of this kind with water.

The pre-condensate can subsequently be further condensed at temperatures between about 220° and 300° C. under normal pressure, and advantageously likewise in an inert-gas atmosphere, until the polyamides according to the invention are formed, and at the end of the polycondensation reaction there is optionally applied a vacuum for degassing the polyamide; or alternatively polycondensation of the pre-condensate, optionally together with an aminocarboxylic acid of the formula II or a corresponding lactam, is performed in solid phase at temperatures up to about 20° C. below the crystallite melting point. The polycondensation reaction in the solid phase is advantageously carried out in vacuo or in an inert-gas atmosphere.

Polyamides according to the invention can also be produced by melt polycondensation of diamines of the formula I with essentially stoichiometric amounts of an activated ester of terephthalic acid, as well as optionally of a diamine of the formula IV with an activated ester of a dicarboxylic acid of the formula III. Suitable activated esters are in particular the corresponding diphenyl esters. The reaction temperatures are in general between about 220° and 320° C. Finally, the polyamides according to the invention can optionally also be produced, in a manner known per se, by condensation in solution or by interfacial surface polycondensation.

The starting products of the formulae II, III and IV to be used according to the invention are known. Diamines of the formula I in which $R_1$ is alkyl having 2–4 C atoms and $R_2$ is alkyl having 1–8 C atoms are novel. These novel diamines and also the other diamines of the formula I can be produced in a particularly advantageous manner by catalytically hydrogenating in the 3,12-position correspondingly substituted 1,2-diaza-1,5,9-cyclododecatriens or 1,2-diazacyclododecanes in the presence of an inert organic solvent.

The polyamides according to the invention are partially crystalline, and are distinguished in particular by a very low absorption of water, high stability to hydrolysis and/or good dimensional stability under the action of moisture, and good dimensional stability under heat, combined with improved mechanical and, in particular, electrical properties.

The polyamides according to the invention can be processed, by methods known per se, into moulded articles of the widest variety. They are particularly suitable for producing filaments and fibres from the melt.

EXAMPLE 1

74.9 g of terephthalic acid, 800 ml of water and 2000 ml of ethanol are placed into a flask provided with stirrer, reflux condenser and dropping funnel, and heated to 50° C. From the dropping funnel is then added, with stirring, 116.6 g of 3,12-diamino-2,13-dimethyltetradecane, and the funnel is rinsed out with 1500 ml of ethanol. A solution is obtained on heating the reaction mixture to 80° C. It is subsequently cooled to 5° C., whereupon the formed salt precipitates. The salt is filtered off, and dried at 90° C. in vacuo; yield: 162.5 g (85% of theory).

15 g of this salt is sealed under nitrogen into a bomb tube and heated to 280° C. The salt initially melts to form a colourless liquid, which solidifies after about one hour as an opaque substance. The pre-condensation is discontinued after 2 hours, and the pre-condensate is removed from the bomb tube. Reduced viscosity of the pre-condensate, measured on a 5% solution in m-cresol at 25° C., is 0.56. The pre-condensate is pulverised, and is then polycondensed in the solid phase in a small flask under a pressure of 0.1 Torr for 12 hours at 280° C. The reduced viscosity of the polyamide obtained, measured on a 0.5% solution in m-cresol at 25° C., is 1.37 dl/g. In a differential calorimeter, the polyamide shows a melting peak with its maximum at 305° C., and a melting heat of 15.3 cal/g. A specimen of the melted polyamide is chilled with water, and then reheated in the differential calorimeter, and the following test values are obtained: glass transition temperature 148° C.; maximum of the crysallisation peak 210° C. with a heat of crystallisation of 10.1 cal/g; and maxima of the double melting peak at 286° C. and 308° C. with a melting heat of 9.1 cal/g. The white polyamide powder is moulded in a hydraulic press at 330° C. into the form of platelets having a thickness of about 0.5 mm; water absorption after 7 days' storage at 20°-25° C. with 65% relative humidity is 1.0% by weight, and water absorption after 7 days' storage in water is 1.7% by weight.

EXAMPLE 2

In a reaction vessel provided with stirrer, dropping funnel and reflux condenser, 11.72 g of terephthalic acid in a mixture of 250 ml of ethanol and 90 ml of water is heated to reflux temperature. There is then added dropwise through the dropping funnel, within 10 minutes, 24.0 g of 1,10-diamino-1,10-dicyclohexyldecane. The reaction mixture is stirred for 48 hours under reflux, and then cooled to 20°-25° C., whereupon the formed salt is filtered off. The yield after drying in vacuo is 34.8 g of salt (98% of theory).

15 g of this salt is polycondensed in the manner described in Example 1. The subsequent processing of the polyamide obtained is carried out at a moulding temperature of 350° C. The properties of the polyamide are summarised in Table 1.

EXAMPLE 3

5.15 g of diphenyl terephthalate and 5.05 g of 1,10-diamino-1,10-dicyclopentyldecane are melted at 210° C. in a condensing tube fitted with a device for introducing nitrogen. Whilst nitrogen is being passed over the melt, the temperature is raised in the course of 5 hours to 280° C. A part of the phenol which has been split off distills off during this time, and the melt gradually solidifies to form an opaque substance. The condensing tube is cooled and its contents are pulverised. The powder, which still contains phenol, is placed into a flask, and subjected under a pressure of 0.03 Torr for 9 hours to a temperature of 280° C. The thermoplastic shaping of the resulting polyamide into the form of platelets is carried out at a temperature of 350° C. The properties of the polyamide are summarised in the Table 1.

EXAMPLE 4

10.0 g of 4,13-diamino-3,14-diethylhexadecane and 10.06 g of diphenyl terephthalate are melted in a condensing tube at 220° C. under nitrogen, and held at this temperature for 4 hours. Whilst nitrogen is being passed through the melt, the temperature is subsequently raised in the course of 2 hours to 270° C., during which time the major part of the phenol that has been split off distills off. After 30 minutes, the tube is carefully evacuated to 14 Torr, and after a further 90 minutes finally to 0.1 Torr. Condensing is continued under these conditions for a further 30 minutes. On cooling, the melt solidifies to form a white-opaque substance. A filament drawn from the melt and stretched by hand shows under a heatable polarising microscope a sharp crystallite melting point of 235°-236° C. Further properties of the polyamide are given in Table 1.

EXAMPLE 5

In a 1 liter Erlenmeyer flask fitted with stirrer, dropping funnel and reflux condenser, 16.61 g of terephthalic acid in a mixture of 300 ml of water and 450 ml of ethanol is heated with stirring to 80° C. There is then added dropwise, through the dropping funnel, 36.86 g of 6,15-diamino-5,16-diethyleicosane, and the mixture is then refluxed for about 5 hours. It is subsequently cooled to 5° C., and the salt which has formed is filtered off. The residue is dried at 90° C. in vacuo, and the yield is 51.2 g (95.8% of theory).

15 g of this salt is sealed under nitrogen into a bomb tube and heated to 270° C. The temperature is lowered after 3 hours, and the solidified pre-condensate is removed and transferred to a condensing tube having a device for introducing nitrogen. The pre-condensate is melted under nitrogen at 270° C. and is then held, while nitrogen is being passed through, for 10 hours at this temperature. The melt on cooling solidifies into the form of a white opaque substance. The reduced solution viscosity of the resulting polyamide, measured on a 0.5% solution in m-cresol at 25° C., is 0.75 dl/g.

A filament drawn from this melt and stretched by hand shows under the polarising microscope a sharp melting point of 224°-225° C. Further properties are summarised in Table 1.

EXAMPLE 6

In the manner described in Example 2, 13.98 g of terephthalic acid and 26.3 g of 5,14-diamino-4,15-dimethyloctadecane are reacted in a mixture of 340 ml of ethanol and 100 ml of water. The formation of salt is finished after 8 hours. The salt is filtered off, and dried at 100° C. in vacuo; yield: 38.3 g of salt (95% of theory).

10 g of this salt is sealed under nitrogen into a bomb tube, and heated for 3 hours at 270° C. After cooling to 20°-25° C., the solidified melt is removed from the bomb tube and transferred to a condensing tube. With a continuous passing through of nitrogen, the pre-condensate is melted in the tube, and polycondensed in the melt for 8 hours at a temperature of 270° C.

The melt solidifies on cooling to form an opaque substance. The properties of the polyamide obtained are summarised in Table 1.

EXAMPLE 7

In the manner described in Example 1, the salt is firstly produced by reaction of 16.61 g of terephthalic acid and 28.45 g of 4,13-diamino-3,14-dimethylhexadecane in a mixture of 200 ml of water and 400 ml of ethanol; yield: 42.5 g (94% of theory).

10 g of this salt is heated in a bomb tube for 3 hours at 280° C. under nitrogen. After cooling, the pre-condensate is removed from the bomb tube and polycondensed in the melt in a condensing tube, while nitrogen is continuously passed through, for 6 hours at 280° C. The properties of the polyamide are summarised in Table 1.

EXAMPLE 8

In the manner described in Example 2, 16.61 g of terephthalic acid is reacted with 39.67 g of 6,15-diamino-5,16-di-n-propyleicosane in a mixture of 400 ml of ethanol and 100 ml of water. The formation of salt has finished after 6 hours and the yield, after filtration and drying, is 48.8 g (87% of theory).

10 g of this salt is polycondensed to a polyamide under the conditions described in Example 6. The properties of the polyamide obtained are summarised in Table 1.

EXAMPLE 9

72.98 g of 4,13-diamino-3,14-diethylhexadecane is added from a dropping funnel, with stirring and refluxing, to a suspension of 38.70 g of terephthalic acid in a mixture of 750 ml of ethanol and 250 ml of water. After 8 hours, the reaction mixture is cooled, and the formed salt is filtered off. Drying at 90° C. in vacuo yields 107.4 g of salt (D) (96% of theory).

9.5 g of this salt is mixed with 0.5 g of 11-aminoundecanoic acid, and the mixture is sealed under nitrogen in a bomb tube, and then immersed for 3 hours in a salt bath at 270° C., during which time the mixture melts to form a colourless liquid and polycondenses, as water is split off, to give a low-molecular pre-condensate. After cooling, the solidified opaque substance is remelted under nitrogen at 270° C. in an open polycondensing tube, and polycondensed at this temperature for 8 hours with the exclusion of air, during which time the reaction water is continuously being removed with the nitrogen passing through the melt. The properties of the copolyamide are summarised in Table 2.

EXAMPLES 10-11

22.87 g of 3,14-diamino-4,13-diethylhexadecane is heated in 300 ml of ethanol to 50° C. and to this solution is added, in one portion, 12.13 g of isophthalic acid. The isophthalic acid dissolves completely after a short time, whilst the solution attains the boiling point as a result of the neutralisation heat. The salt which has formed commences to precipitate after a few minutes. After cooling to room temperature, the salt is filtered off and dried at 80° C. in vacuo. The yield is 32.2 g of salt (E) (92% of theory).

2 g of this salt (E) is mixed with 8 g of salt (D) from Example 9, and the mixture is polycondensed to a copolyamide under the conditions given in Example 9.

The procedure is carried out in like manner with a mixture of 2.5 g of salt (E) from the preceding description and 7.5 g of salt (D) from Example 9.

The properties of the two copolyamides are summarised in Table 2.

EXAMPLES 12-14

14.61 g of adipic acid is heated in 100 ml of ethanol to 50° C., and a solution of 32.32 g of 4,13-diamino-3,14-diethylhexadecane in 80 ml of ethanol is added. The clear solution which is formed is gradually cooled to −5° C., whereupon the salt precipitates. The yield after filtration and drying is 31.4 g of salt (F) (68% of theory).

Various salt mixtures of the salt (F) obtained above and salt (D) from Example 9 are polycondensed under the conditions described in Example 9.

EXAMPLE 15

0.404 g of 1,12-diaminododecane, 0.407 g of sebacic acid and 15.46 g of salt (D) from Example 9 are weighed into a bomb tube, and polycondensed as described in Example 9.

The properties of the copolyamide are given in Table 2.

EXAMPLE 16

In the same manner are mixed 0.303 g of 1,12-diaminododecane and 0.249 g of terephthalic acid with 10.04 g of salt (D) from Example 9, and the mixture is polycondensed in the way described in Example 9.

The properties of the copolyamide are listed in Table 2.

TABLE I

| Example No. | Acid | Diamine | reduc. solvent viscosity[1] | Glass transition temperature (DSC) °C. | Melting point (DSC) °C. | Melting heat (DSC) cal/g | Water absorption after 1 week's storage at 20-25° C./65% relat. humidity. % by wt. |
|---|---|---|---|---|---|---|---|
| 2 | TPS | 1,10-diamino-1,10-dicyclohexyldecane | 0.88 | 172 | 332 | 12.4 | 0.8 |
| 3 | TPS | 1,10-diamino-1,10-dicyclopentyldecane | 0.72[2] | 163 | 342 | 18.6 | 0.7 |
| 4 | TPS | 4,13-diamino-3,14-diethylhexadecane | 0.78 | 150–160[3] | 235 | 11.9 | 0.4 |
| 5 | TPS | 6,15-diamino-5,16-diethyleicosane | 0.75 | 150–160[3] | 225 | 9.6 | 0.2 |
| 6 | TPS | 5,14-diamino-4,15-dimethyloctadecane | 0.82 | 151 | 215 | 7.1 | 0.5 |
| 7 | TPS | 4,13-diamino-3,14-dimethylhexadecane | 1.05 | 153 | 273 | 7.2 | 0.6 |
| 8 | TPS | 6,15-diamino-5,16-di-n-propyleicosane | 0.86 | 150–160[3] | 223 | 10.0 | 0.2 |

TPS = terephthalic acid
DSC = measured in a differential calorimeter
[1] measured on 0.5% solution in m-cresol at 25° C. (dl/g)
[2] measured on 0.5% solution in dichloro-acetic acid (dl/g)
[3] cannot be exactly evaluated in the DSC

TABLE 2

Copolyamides based on terephthalic acid/4,13-diamino-3,14-diethylhexadecane with proportions of other polyamide components

| Example No. | Basic component for the additional polyamide part | Amount added % by wt. | red. solution viscosity | Glass transition temperature (DSC) °C. | Melting point (DSC) °C. | Melting heat (DSC) cal/g |
|---|---|---|---|---|---|---|
| 9 | 11-aminodecanoic acid | 5 | 0.63 | 151 | 215 | 4 |
| 10 | IPS/4,13-diamino-3,14-diethylhexadecane (salt E) | 20 | 0.65 | 156 | 204 | 4 |
| 11 | IPS/4,13-diamino-3,14-diethylhexadecane (salt E) | 25 | 0.69 | 147 | 198 | 2.3 |
| 12 | ADS/4,13-diamino-3,14-diethylhexadecane (salt F) | 5 | 0.70 | 130–150[1] | 229 | 16.1 |
| 13 | ADS/4,13-diamino-3,14-diethylhexadecane (salt F) | 10 | 0.83 | 130–150[1] | 221 | 13.4 |
| 14 | ADS/4,13-diamino-3,14-diethylhexadecane (salt F) | 20 | 0.67 | 130–150 | 206 | 12.2 |
| 15 | 12,10-salt | 5 | 0.74 | 147 | 215 | 4.8 |
| 16 | TPS/1,12-diaminododecane | 5 | 0.73 | 150–160 | 225 | 12.2 |

IPS = isophthalic acid
ADS = adipic acid
12,10-salt = salt from equivalent amounts of 1,12-diaminododecane and sebacic acid
[1] = cannot be exactly evaluated in the DSC The diamines used in the Examples 1–8 can be produced as follows:

(a) 3,12-Diamino-2,13-dimethyltetradecane 250 g (1 mol) of 3,12-diisopropyl-1,2-diaza-1,5,9-cyclododecatriene (diastereoisomeric mixture) is dissolved in 1000 ml of t-butanol in an autoclave with stirrer. After the addition of 25 g of a rhodium-/aluminium catalyst (5% by weight of rhodium), hydrogen is injected up to a pressure of 130–150 bars, and hydrogenation is then performed at 150°–180° C. until completion of hydrogen absorption. After cooling, the excess hydrogen is released, the suspension is drawn out by suction, and the catalyst is filtered off through a small amount of "Hyflo" (filtering agent). The filtrate is concentrated in a rotary evaporator, and the product is purified by distillation. There is obtained, as the main fraction, 238 g (94% of theory) of 3,12-diamino-2,13-dimethyltetradecane in the form of colourless oil [b.p. 106°–109° C./0.01 Torr; $n_D^{20}=1.4600$; IR (liquid) inter alia bands at 3355, 3278 and 1613 cm$^{-1}$].

(b) 5,14-Diamino-4,15-dimethyloctadecane

If there are used in the manner described under (a), instead of 250 g (1 mol) of 3,12-diisopropyl-1,2-diaza-1,5,9-cyclododecatriene, 61 g (0.2 mol) of 3,12-di-(2-pentyl)-1,2-diaza-1,5,9-cyclododecatriene (diastereoisomeric mixture) and correspondingly reduced amounts of catalyst and solvent, using otherwise the same procedure, there is obtained, as the main fraction, 48.4 g (77% of theory) of 5,14-diamino-4,15-dimethyloctadecane in the form of colourless oil [b.p. 155°–159° C./0.03 Torr; $n_D^{20}=1.4632$; IR (liquid) inter alia bands at 3246, and 1613 cm$^{-1}$].

(c) 4,13-Diamino-3,14-diethylhexadecane

If there are used in the manner described under (a), instead of 250 g (1 mol) of 3,12-diisopropyl-1,2-diaza-1,5,9-cyclododecatriene, 49 g (0.159 mol) of 3,12-di-(3-pentyl)-1,2-diazacyclododecane and correspondingly reduced amounts of catalyst and solvent, with the procedure otherwise remaining the same, there is obtained, after chromatographical purification and distillation, 26.8 g (54% of theory) of 4,13-diamino-3,14-diethylhexadecane in the form of colourless oil [b.p. 141°–143° C./0.004 Torr; $n_D^{20}=1.4666$; IR (liquid) inter alia bands at 3378, 3278 and 1613 cm$^{-1}$].

(d) 1,10-Diamino-1,10-dicyclopentyldecane

If there are used in the manner described under (a), instead of 250 g (1 mol) of 3,12-diisopropyl-1,2-diaza-1,5,9-cyclododecatriene, 200 g (0.666 mol) of crude 3,12-dicyclopentyl-1,2-diaza-1,5,9-cyclododecatriene (diasterioisomeric mixture) and correspondingly reduced amounts of catalyst and solvent, the procedure otherwise being the same, there is obtained, after chromatographical purification and distillation, 39.2 g (19% of theory) of 1,10-diamino-1,10-dicyclopentyldecane in the form of colourless oil [b.p. 174°–178° C./0.002 Torr; $n_D^{20}=1.4885$; IR (liquid) inter alia bands at 3355, 3278 and 1613 cm$^{-1}$].

(e) 1,10-Diamino-1,10-dicyclohexyldecane

If there are used in the manner described under (a), instead of 250 g (1 mol) of 3,12-diisopropyl-1,2-diaza-1,5,9-cyclododecatriene, 328.5 g (1 mol) of 3,12-dicyclohexyl-1,2-diaza-1,5,9-cyclododecatriene (diastereoisomeric mixture) and correspondingly reduced amounts of catalyst and solvent, with otherwise the same procedure, there is obtained, as the main fraction, 304 g (90% of theory) of 1,10-diamino-1,10-dicyclohexyldecane in the form of colourless oil [b.p. 190°–193° C./0.05 Torr; $n_D^{20}=1.4944$; IR (liquid) inter alia bands at 3355, 3278 and 1613 cm$^{-1}$].

(f) 6.15-Diamino-5,16-diethyleicosane

If there are used in the manner described under (a), instead of 250 g (1 mol) of 3,12-diisopropyl-1,2-diaza-1,5,9-cyclododecatriene, 74.8 g (0.2 mol) of 3,12-di-(3-heptyl)-1,2-diazacyclododecane (diastereoisomeric mixture) and correspondingly reduced amounts of catalyst and solvent, with otherwise the same procedure, there is obtained, after chromatographical purification and distillation, 29.9 g (40% of theory) of 6,15-diamino-5,16-diethyleicosane in the form of colourless oil [b.p. 170° C./0.01 Torr; $n_D^{20}=1.4662$; IR (liquid) inter alia bands at 3278 and 1613 cm$^{-1}$].

The 1,2-diaza-1,5,9-cyclododecatriene and 1,2-diazacyclododecane, used as starting products, can be produced by the methods described in the German Offenlegungsschriften Nos. 2,330,087 and 2,549,403.

(g) 4,13-Diamino-3,14-dimethylhexadecane

If there are used in the manner described under (a), instead of 250 g (1 mol) of 3,12-diisopropyl-1,2-diaza-1,5,9-cyclododecatriene, 87.3 g (0.31 mol) of 3,12-di-(2-butyl)-1,2-diaza-1,5,9-cyclododecatriene (diastereoisomeric mixture) and correspondingly reduced amounts of catalyst and solvent, with otherwise the same procedure, there is obtained, as the main fraction, 74.7 g (85% of theory) of 4,13-diamino-3,14-dimethylhexadecane in the form of colourless oil [b.p. 143°–5° C./0.05 Torr; $n_D^{20}=1.4639$; IR (liquid) inter alia bands at 3330 and 1626 cm$^{-1}$].

(h) 6,15-Diamino-5,16-dipropyleicosane

If there are used in the manner described under (a), instead of 250 g (1 mol) of 3,12-diisopropyl-1,2-diaza-1,5,9-cyclododecatriene, 35.9 g (0.09 mol) of crude 3,12-di-(4-octyl)-1,2-diaza-1,5,9-cyclododecatriene and correspondingly reduced amounts of catalyst and solvent, with otherwise the same procedure, there is obtained, after chromatographical purification and bulb-tube distillation, 8.8 g (24% of theory) of 6,15-diamino-5,16-dipropyleicosane in the form of colourless oil [$n_D^{20}=1.4655$; IR (liquid) inter alia bands at 3380, 3300 and 1623 cm$^{-1}$].

We claim:

1. A partially crystalline fiber-forming polyamide of essentially stoichiometric amounts of (1) terephthalic acid, or of an amide-forming derivative thereof, with (2) a diamine of the formula (I)

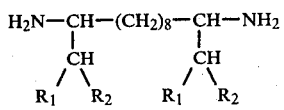         (I)

in which
  $R_1$ is alkyl having 1–4 C atoms,
  $R_2$ is alkyl having 1–8 C atoms, or
  $R_1$ and $R_2$ together with the linkage C atom to which they are attached are in both cases cycloalkyl having 4–6 C atoms,
(3) from zero to 5% by weight of an aminocarboxylic acid of the formula (II)

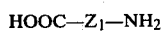         (II)

in which $Z_1$ is alkylene having 5 to 11 C atoms, or of a corresponding lactam, or (4) zero to 30% by weight of an essentially stoichiometric mixture of a dicarboxylic acid of the formula (III)

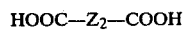         (III)

in which $Z_2$ is an aliphatic radical having at least 2 C atoms, or a carbocyclic-aromatic radical in which the carbonyl groups are bound to different ring C atoms which are not adjacent, or of an amide-forming derivative thereof, with a diamine of the formula (IV)

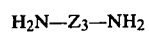         (IV)

in which $Z_3$ is

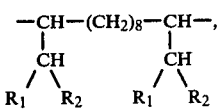

straight-chain alkylene having 2–12 C atoms, or a cycloaliphatic or araliphatic radical; and wherein the defined weight percentages in the case of amide-forming derivatives of terephthalic acid and of the dicarboxylic acid of the formula (III) relate to identical functional groups.

2. A polyamide according to claim 1, of 100 percent by weight of a mixture of essentially stoichiometric amounts of terephthalic acid, or of an amide-forming derivative thereof, and a diamine of the formula (I).

3. A polyamide according to claim 1, of a reaction mixture containing, as diamine of the formula (I), 4,13-diamino-3,14-diethylhexadecane and zero to 5% by weight of an aminocarboxylic acid of the formula (II) or of the corresponding lactam, or zero to 30% by weight of a mixture of essentially stoichiometric amounts of a dicarboxylic acid of the formula (III), or of an amide-forming derivative thereof, and a diamine of the formula (IV).

4. A polyamide according to claim 1, of 100 percent by weight of a mixture of essentially stoichiometric amounts of terephthalic acid, or of an amide-forming derivative thereof, and a diamine of the formula (I) in which $R_1$ and $R_2$ independently of one another are alkyl having 1–4 C atoms, or $R_1$ and $R_2$ together with the linkage C atom to which they are attached are in both cases cyclopentyl or cyclohexyl.

5. A polyamide according to claim 1, of 100 percent by weight of a mixture of essentially stoichiometric amounts of terephthalic acid, or of an amide-forming derivative thereof, and a diamine of the formula (I) in which $R_1$ is methyl or ethyl, and $R_2$ is ethyl, n-propyl or n-butyl.

6. A polyamide according to claim 1, of 100 percent by weight of a mixture of essentially stoichiometric amounts of terephthalic acid, or of an amide-forming derivative thereof, and a diamine of the formula (I) in which $R_1$ is methyl, and $R_2$ is ethyl, or $R_1$ is ethyl and $R_2$ is ethyl.

7. A molded article or melt-spun filament or fiber made from the polyamide according to claim 1.

* * * * *